UNITED STATES PATENT OFFICE.

PHILIP F. APFEL AND NEELIE B. APFEL, OF SEATTLE, WASHINGTON.

CEMENT MATERIAL.

1,014,995.  Specification of Letters Patent.  Patented Jan. 16, 1912.

No Drawing.  Application filed November 15, 1909.  Serial No. 528,059.

*To all whom it may concern:*

Be it known that we, PHILIP F. APFEL and NEELIE B. APFEL, citizens of the United States, residing at Seattle, in the county of King and State of Washington, have invented a new and useful Cement Material, of which the following is a specification.

The object of our invention is to provide an improved cement material which shall be comparatively inexpensive to manufacture and exceptionally durable in possessing the quality of resisting contraction and expansion under change of temperature and with age.

The essential ingredients for the compound forming our new cement-material are magnesium oxid and sodium bicarbonate; and the material may be produced as follows: By intimately mixing 1 part of magnesium oxid with an equal part of bicarbonate of soda either in water or in the form of dry powders, subsequently mixed with water; sufficient water being used to dissolve the sodium bicarbonate and unite it with the magnesium oxid, forming an insoluble cement, to which may be added, either before or after adding the water, suitable filler-material, such as sand, sawdust and marble-dust, or any or all of these, to increase its volume and wearing quality and eliminate tendency to expansion and contraction with age and variations in temperature, and also suitable coloring material.

A somewhat modified procedure consists in mixing magnesium oxid with a saturated solution of sodium bicarbonate in water to the consistency of a thick paste, and adding any or all of the above-named fillers, if required, to obtain the desired coefficient of expansion in the finished material. The resultant paste is adapted to be molded into plates or tiles, which may be given any desired color by mixing with the paste suitable coloring matter or blended colors, as for producing the articles in imitation of marble, scagliola, onyx, or other natural or artificial stones; or the paste may be laid on wood, stone, cement or other floor or wall foundation and troweled, like ordinary cement, until it becomes hard and smooth, or it may be molded on glass or other polished surfaces to cause it to receive therefrom, when hard, a polished surface.

What we claim as new and desire to secure by Letters Patent, is—

1. A cement-material consisting of a water-combined mixture of magnesium-oxid and sodium bicarbonate.

2. A cement-material consisting of a water-combined mixture of magnesium-oxid and sodium bicarbonate, with filler-material.

3. A cement-material consisting of a water-combined mixture of magnesium-oxid and sodium-bicarbonate, with filler-material and coloring material.

4. A cement-material, consisting of a paste composed of a mixture of magnesium-oxid and a saturated solution in water of sodium bicarbonate.

5. A cement-material consisting of a paste composed of a mixture of magnesium-oxid and a saturated solution in water of sodium bicarbonate, with filler-material.

6. A cement-material consisting of a paste composed of a mixture of magnesium oxid and a saturated solution of sodium bicarbonate, with filler and coloring materials.

PHILIP F. APFEL.
NEELIE B. APFEL.

In presence of—
IVAN L. HYLAND,
WILMON TUCKER.

Copies of this patent may be obtained for five cents each, by addressing the "Commissioner of Patents, Washington, D. C."